US007649688B2

(12) United States Patent
Racette et al.

(10) Patent No.: US 7,649,688 B2
(45) Date of Patent: Jan. 19, 2010

(54) AUTO-STEREO THREE-DIMENSIONAL IMAGES

(76) Inventors: Louis Racette, 5135 rue Maurice, St. Hubert (QC) (CA) J3Y 2N3; Rémi Blanchard, 3374 Soissana, Longueuil (QC) (CA) J4L 3M4

( * ) Notice: Subject to any disclaimer, the term of this patent is extended or adjusted under 35 U.S.C. 154(b) by 0 days.

(21) Appl. No.: 10/680,428

(22) Filed: Oct. 8, 2003

(65) Prior Publication Data

US 2005/0078368 A1    Apr. 14, 2005

(51) Int. Cl.
*G02B 27/22* (2006.01)
(52) U.S. Cl. ...................................... 359/464; 359/462
(58) Field of Classification Search ................ 359/462, 359/463, 466, 464; 345/32, 419; 355/22; 348/54, 56
See application file for complete search history.

(56) References Cited

U.S. PATENT DOCUMENTS

| 2,209,747 A | | 7/1940 | Eisler |
| 4,128,324 A | | 12/1978 | Seeger |
| 4,829,365 A | | 5/1989 | Eichenlaub |
| 5,113,213 A | * | 5/1992 | Sandor et al. ............... 355/22 |
| 5,543,964 A | | 8/1996 | Taylor et al. |
| 5,663,831 A | | 9/1997 | Moshitani et al. |
| 5,678,095 A | | 10/1997 | Takezaki |
| 5,949,390 A | * | 9/1999 | Nomura et al. ............. 345/32 |
| 5,953,148 A | * | 9/1999 | Moseley et al. ............ 359/237 |
| 5,969,850 A | | 10/1999 | Harrold et al. |
| 5,991,073 A | | 11/1999 | Woodgate |
| 6,046,849 A | | 4/2000 | Moseley et al. |
| 6,055,013 A | | 4/2000 | Woodgate et al. |
| 6,118,584 A | * | 9/2000 | Van Berkel et al. ........ 359/463 |
| 6,128,132 A | | 10/2000 | Wieland et al. |
| 6,151,062 A | | 11/2000 | Inoguchi et al. |
| 6,342,969 B1 | | 1/2002 | Lee |
| 6,437,915 B2 | | 8/2002 | Moseley et al. |
| 6,445,406 B1 | | 9/2002 | Taniguchi et al. |
| 6,459,532 B1 | | 10/2002 | Montgomery et al. |
| 6,473,141 B2 | | 10/2002 | Moseley et al. |
| 6,483,644 B1 | | 11/2002 | Gottfried et al. |
| 2001/0050787 A1 | | 12/2001 | Crossland et al. |
| 2003/0107686 A1 | | 6/2003 | Sato |

FOREIGN PATENT DOCUMENTS

CA            1287395         11/1987

* cited by examiner

*Primary Examiner*—Audrey Y Chang
(74) *Attorney, Agent, or Firm*—Anglehart et al.

(57) ABSTRACT

There is described a method for providing auto-stereo three-dimensional views from a plurality of points of view, the method comprising: providing an image on a substrate made of a medium of sufficient transparency to allow light therethrough, the image being made up of a plurality of cells; placing a barrier screen in front of the image to provide a parallax effect, the barrier screen consisting of an optical arrangement providing staggered apertures through which light can pass, each of the apertures defining a window onto one of the plurality of cells and configured such that a view of a neighboring cell is obstructed from all of the points of view; and illuminating the image using a light source.

10 Claims, 9 Drawing Sheets

Pattern of Long Vertical Continuous Lines

The Apparatus

Multiple Points of Views

Pattern of Short Offset & Vertical Slits

Opaque Rippled Line drawn on top & bottom of Cells

Groove Separation between Cells

Opaque Separator between Cells

Look Front Method

Look at Object Method

Look at Slit Method

Optimizing Number of Views

Method to Generate the Computer-Processed Image (Top View)

PRINTING ONTO A FIRST SIDE OF A TRANSPARENT SHEET AN IMAGE HAVING A PLURALITY OF CELLS MAKING UP THE IMAGE

PRINTING ONTO A SECOND SIDE OF THE TRANSPARENT SHEET A BARRIER SCREEN IN ORDER TO GET A DESIRED EFFECT

AUTO-STEREO THREE-DIMENSIONAL IMAGES

FIELD OF THE INVENTION

The invention relates to auto-stereo three-dimensional images. More specifically, it relates to creating fixed high quality, high-definition color 3-D illustrations having multiple auto-stereo views.

BACKGROUND OF THE INVENTION

Many arrangements exist for presenting images in three-dimensions. One method is to color encode images for separate presentation to the left and right eyes of a viewer. The viewer perceives the motion picture as 3-D when viewing the projected images through special glasses having two different colored lenses which "decode" the separate right and left-eye images. This arrangement does not generate a true "auto-stereo" or automatic 3-D image in that, when viewed without the aid of the decoding glasses, the image does not appear three-dimensional.

Auto-stereoscopic displays require no viewing aids to be worn by the observer. Instead, the two views are only visible from defined regions of space. The region of space in which an image is visible across the whole of the display active area is termed a "viewing region". If the observer is situated such that one eye is in one viewing region and the other eye is in the other viewing region, then a correct set of views is seen and a 3D image is perceived. For auto-stereoscopic displays of the "flat panel" type, the viewing regions are formed by a combination of the picture element (pixel) structure of the display and an optical element, generically termed a parallax optic. An example of such an optic is a parallax barrier. The parallax barrier permits the right eye of a viewer to view only the strips of the right-eye image and permits the left eye of a viewer to view only the strips of the left-eye image. Viewed separately, these left and right-eye images result in a single image which appears three-dimensional.

Generating an auto-stereo image requires the following. When passing through a specially computer-processed image, the light takes on the color of that specific area of the image. The colored light goes through each aperture of a parallax barrier screen, which in turn projects it toward one direction in space. The resulting images, as formed by all the apertures of a barrier screen, are specific to each point of view. By combining the plurality of points of view, the object will be perceived as a "real" 3-D illustration. As we increase the number of views and/or apertures the smoother the auto-stereo image becomes.

One problem with this arrangement comes from the fact that the large projection screen sits behind a parallax barrier. Indeed, the opaque regions of the parallax barrier block most of the light coming out of the projection screen and only those parts of the projection screen behind apertures are visible to the viewer. In this case, it is expensive and wasteful to light up the whole surface of the projection screen, since most of the light is never visible.

In the early 1900, Clarence W. Kanolt invented a static 3-D images system using a barrier-screen formed of continuous vertical lines (FIG. 1). From Kanolt's invention, a variety of applications are currently being developed, such as the 3-D television systems described in U.S. Pat. Nos. 2,209,747 and 5,663,831. To obtain a similar quality in the appreciation of the 3-D output, the process of using a pattern of regular continuous vertical lines requires that the definition be more than twice that of a process using staggered or offset slits. Therefore, given similar definition and/or limitations, the long continuous vertical lines will be more than twice as apparent thus negatively affecting the overall quality of the 3-D illustration since the observer is distracted by the continuous vertical lines.

Another form of barrier screen, which uses a staggered honeycomb pattern of small apertures, was developed to generate static 3-D photographic images, as described in U.S. Pat. No. 4,128,324. However, this technique minimizes image definition because each aperture can only provide a single pixel. Given similar ambient light, this system minimizes the quantity and brightness of light emanating from behind the image, which results in very poor visibility as defined by the distance of the observer from the illustration.

From continuous vertical lines, a new innovative system using a barrier screen formed of a parallax or short vertical slits or apertures, which are provided in an alternating grid pattern whereby the adjacent columns are staggered or offset from one another, was developed to generate a 3-D motion picture, as described in U.S. Pat. No. 6,128,132. It is desirable for the apertures to repeat or align in offset or alternate pattern of rows and for the pattern to be non-visually repetitive as it reduces the perceived pattern of dots or stripes. While this approach to the barrier screen attenuates the restrictions of the previous arrangements, the costs associated to the system found in U.S. Pat. No. 6,128,132 render it almost unfeasible.

The goal of U.S. Pat. No. 6,128,132 is to generate a 3-D motion picture using less than 100 views. Should this system be used to generate a similar fixed 3-D image, composed of 1,000 or more views, the cost would increase to such an extent as to render the making of this image cost-intensive and quite unfeasible.

Therefore, there is a need to develop a method and apparatus that will reduce the costs of generating a fixed 3-D image, while providing high quality and high-definition three-dimensional images.

SUMMARY OF THE INVENTION

According to a first broad aspect of the present invention, there is provided an apparatus for generating auto-stereo three-dimensional views from a plurality of points of view, the apparatus comprising: an image on a substrate, the image containing dark separation lines between cells and the substrate being of a medium of sufficient transparency to allow light therethrough; a light source for illuminating the image; and a slit-type barrier screen placed in front of the image to provide a parallax effect, the barrier screen consisting of a substantially opaque surface with clear, staggered apertures through which light can pass from a first side to a second side; wherein the dark separation lines of the image have a rippled shape corresponding to said staggered apertures and prevent image bleeding between the cells.

Preferably, the apertures are short, vertical apertures, arranged in a plurality of horizontal rows, wherein each row is horizontally offset with respect to its subsequent row. Apertures of every other row are aligned vertically.

According to a second broad aspect of the present invention, there is provided a method for providing auto-stereo three-dimensional views from a plurality of points of view, the method comprising: providing an image on a substrate made of a medium of sufficient transparency to allow light therethrough, the image being made up of a plurality of cells; placing a barrier screen in front of the image to provide a parallax effect, the barrier screen consisting of an optical arrangement providing apertures through which light can pass, each of the apertures defining a window onto one of the plurality of cells and configured such that a view of a neighboring cell is obstructed from all of the points of view; and illuminating the image using a light source.

According to a third broad aspect of the present invention, there is provided a method of manufacturing a three-dimensional auto-stereo image, the method comprising printing onto a first side of a transparent substrate an image having a plurality of cells making up the image, and printing onto a second side of the transparent substrate a barrier screen in order to get a desired effect.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

In the following description, numerous specific details are set forth in order to provide a more thorough description of the present invention. It will be apparent, however, to one skilled in the art, that the present invention may be practiced without these specific details. In some instances, well-known features may have not been described in detail so as not to obscure the invention.

The term auto-stereo should be understood as meaning either fixed or partially animated high-quality, high-definition color "real" 3-D illustrations, or any other type of image effect, where the various points of view must be generated from different independent images. The image used is made up of a plurality of cells, each cell being composed of a plurality of pixels.

The invention relates to a method and an apparatus for creating fixed high-quality, high-definition, color "real" 3-D illustrations having multiple auto-stereo views. The apparatus provides a plurality of points of view, which in turn allows many viewers to simultaneously visualize a high quality auto-stereo or "real" 3-D color image. Unless standing in the same spot, each viewer, while actually seeing the same overall scene, will also see different information. The method and apparatus of the present invention ensure that the information coming through a given slit in a slit-type barrier screen comes from only one cell and not from any adjacent cell. There are many ways in which the information from the adjacent cells can be blocked. In a preferred embodiment, the image itself is generated such that the adjacent cell information cannot pass through a same slot in a barrier screen. Alternatively, the barrier screen or the spacer in between the image and the barrier screen are configured to prevent information from different cells to appear in a same slit.

Figure 1:
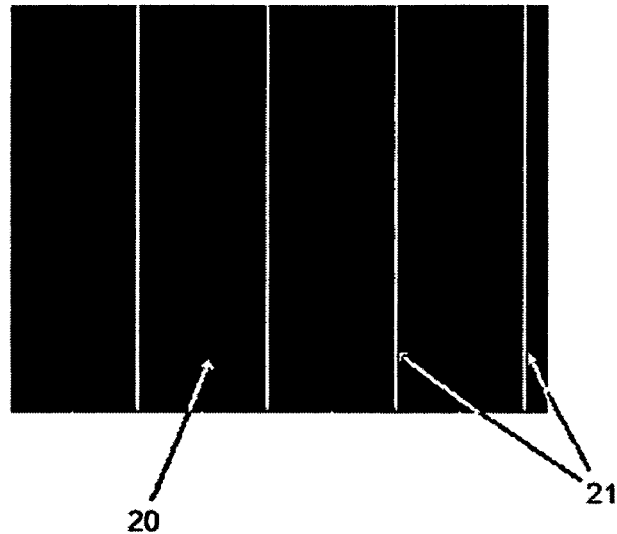
FIG. 1 illustrates a pattern of long continuous vertical lines.
Figure 2:
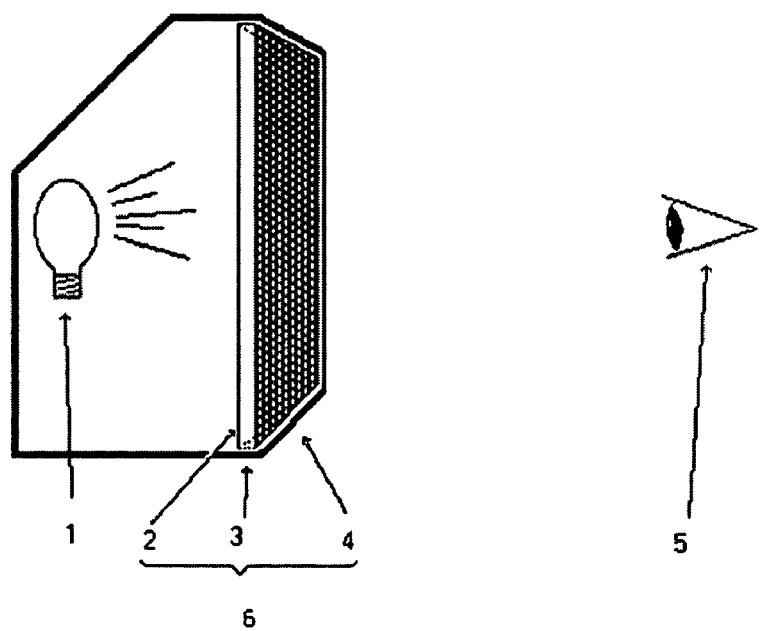
FIG. 2 illustrates an apparatus for creating an auto-stereo image in accordance with one embodiment of the invention. This apparatus contains the 3-D cast (made up of 3 components) and the light source.

The apparatus of FIG. 2 is a display unit for generating auto-stereo images. It contains at least one highly efficient light source 1 placed on the back panel. Optional heat and light sensors to monitor and provide a controlled and safe environment that will ensure optimal rendering of the "real" 3-D illustration are also present. When heat, generated by the light source 1, reaches a critical point it must be eliminated or dispersed with devices such as fans and/or vents strategically positioned on the display unit. Optional light diffusers are placed between the emitted light 1 and the 3-D Cast 6. The 3-D cast 6 comprises a barrier screen 4, the barrier screen 4 having a first side and a second side and defining a multitude of apertures 21 through which light may pass from said first side to said second side. The 3-D cast 6 also comprises a spacer 3 and a computer-processed image 2. A moving front panel, which gives access to inside the display, will be made of a transparent anti-reflective, anti-glare material. This part of the display will eliminate reflections that would cause distraction for the viewers as well as protecting the internal components from the exterior environment. The display unit also traps the emitted light 1 so as to direct it through the computer-processed image 2 toward the viewer 5. The light source 1 generates light onto the back of the translucent computer-processed image 2. Light projected by the light source 1 selectively passes through the translucent computer-processed image 2 that contains all of the available points of view, the transparent spacer 3 and the slits 21 of the barrier screen 4.

The apparatus or display unit seen in FIG. 2 comprises at least one efficient light source 1 and the 3-D cast 6. Once assembled, the 3-D cast can be viewed in "real" 3-D without requiring special visual aids such as glasses, virtual reality headsets and the like. The resulting "real" 3-D rendering is appropriate for viewing by the left and right eyes of one or more viewers 5, who, unless standing at the same position, observe different information emanating from the object.

Each of the components of the 3-D cast, described above, has unique characteristics. The barrier screen 4 is made from a number of relatively short and narrow, substantially transparent vertical slits or apertures which are staggered or offset from one another. To eliminate vertical distortions perceived when the viewer observes the 3-D image past a certain vertical angle each row of slits may be separated by a vertical gap. The front side of the barrier screen is made of a layer of opaque material such as black ink while the backside, which faces the light source, is made of a layer of non-absorbing, highly reflective material such as metallic, silver or white ink. This non-absorbing highly reflective material recycles the light in such a way as to maximize the available lighting thus reducing the energy consumption, the heat and the quantity of lumens, which are required to optimize the colors of the image. Other characteristics of the barrier screen are the horizontal distance between the apertures, and the length and width of the slits, which are part of the parameterization.

The spacer or support medium is made of ultra clear material such as polyester film. Its thickness may vary depending on the application. Thus, the thinner the spacer the greater the angle of vision and when combined with the properties of the barrier screen it will greatly enhance the image definition. The spacer is used as the print support media whenever possible. It should be understood that the image must be supported by a substrate. When possible the spacer is the substrate on which the image is supported. The barrier screen may also be placed directed on the substrate. Alternatively, the barrier screen is a separate element and is combined with the image on the substrate within the apparatus.

The 3 main components that make up the 3-D cast, as described above, are assembled and aligned using various systems, which may include printing and/or lamination processes. To optimize the real 3-D effect of the 3-D cast, it must be viewed from the barrier screen side. The position of the image and the barrier screen can be interchanged thus providing an auto-stereo illustration with differentiating characteristics. The 3-D image can then be viewed from the image side. The image and the light source can be combined in a self-light emitting image, similar to a CRT console or other viewing devices such as plasma, LED, LCD and others.

Multiple points of view (FIG. 3) are formed from individual slits 21. When viewers 5 look through individual slits 21, a relationship is created between the points of view 10a to 10d and the corresponding information 9a to 9d on the computer-processed image 2. That is, each of the cells provides a range of interspersed views for the region of the image in which the cell is located.

Figure 4:
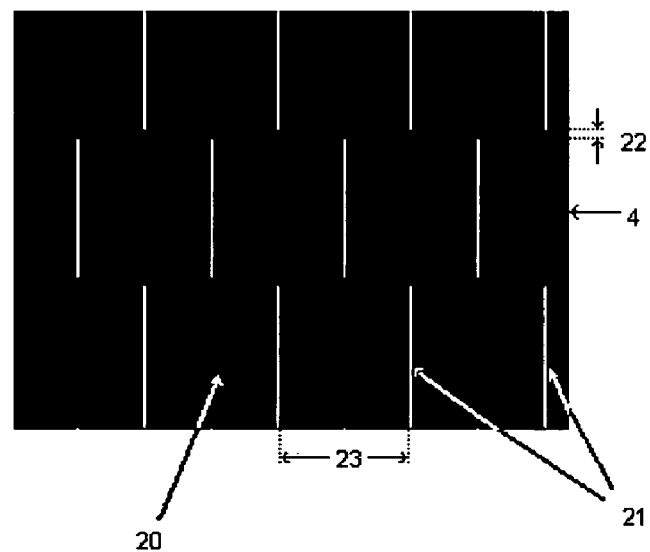
FIG. 4 illustrates a pattern of short alternate & offset vertical slits as well as the horizontal distance between the individual slits and the vertical gap between the rows of slits.

In general, the barrier screen 4 is a parallax or "slit"-type barrier screen (FIG. 4). The barrier screen 4 is generated using efficient tools such as computers and self-developed and/or pre-packaged software. The output file, when in vector graphic format, has the advantage of minimal size and portability. In one embodiment, the barrier screen 4 may be printed directly on a support media such as clear polymer films or plastic. In another embodiment, the barrier screen 4 may be generated as an acetate film screen. However, these methods are by no way exhaustive. In such an arrangement, the barrier screen 4 has a black or other substantially opaque surface 20 with clear transparent slits 21.

The barrier screen 4 need not be a single element. For example, the barrier screen 4 may be formed in a modular fashion from a number of interrelated smaller barrier screen elements. The barrier screen 4 may be formed to be free standing or require one or more support elements. Also, the barrier screen 4 may be formed directly on another element. The exact size of the barrier screen 4, such as its width and height, may vary depending upon the specific application of the apparatus. For example, when used for murals or wall banners the barrier screen 4 may be much larger than when used for a point of purchase size image. The opaque surface 20 of the barrier screen 4 generally prevents light projected from the light source 1 from passing from the rear side to the front side of the screen. Light projected onto the barrier screen 4 by the light source 1 does pass, however, through the transparent apertures 21.

Those of skill in the art will appreciate that the barrier screen 4 may be arranged in a wide variety of manners to provide the above-stated effects. The barrier screen 4 may also be constructed of a relatively rigid, opaque material such as black plastic or metal sheet having either multiple openings or transparent slits that form the apertures 21. The barrier screen 4 may comprise a glass sheet having a thin layer of metal deposited thereon, the apertures 21 comprising areas in which no metal is deposited on the glass. The barrier screen 4 may also comprise a clear transparent sheet of polymer on which several layers of ink may be applied to create the barrier screen 4. However, these methods are by no way exhaustive. Theses particular arrangements of the barrier screen 4 are simple to construct and yet have substantial rigidity. Such characteristics prevent the screen 4 from moving and precisely fixes the positions of the apertures 21.

In one or more embodiments, the apertures 21 are provided in an alternating grid pattern (FIG. 4). The apertures 21 are provided in spaced fashion in vertical columns. The apertures 21 of adjacent columns are staggered or offset (FIG. 4) from one another. Apertures 21 are arranged in horizontal rows, each horizontal row comprising multiple apertures 21. Apertures 21 in adjacent rows in the vertical direction offset in a horizontal direction. Apertures 21 in said horizontal rows only align in the vertical direction every second horizontal row.

Figure 5:
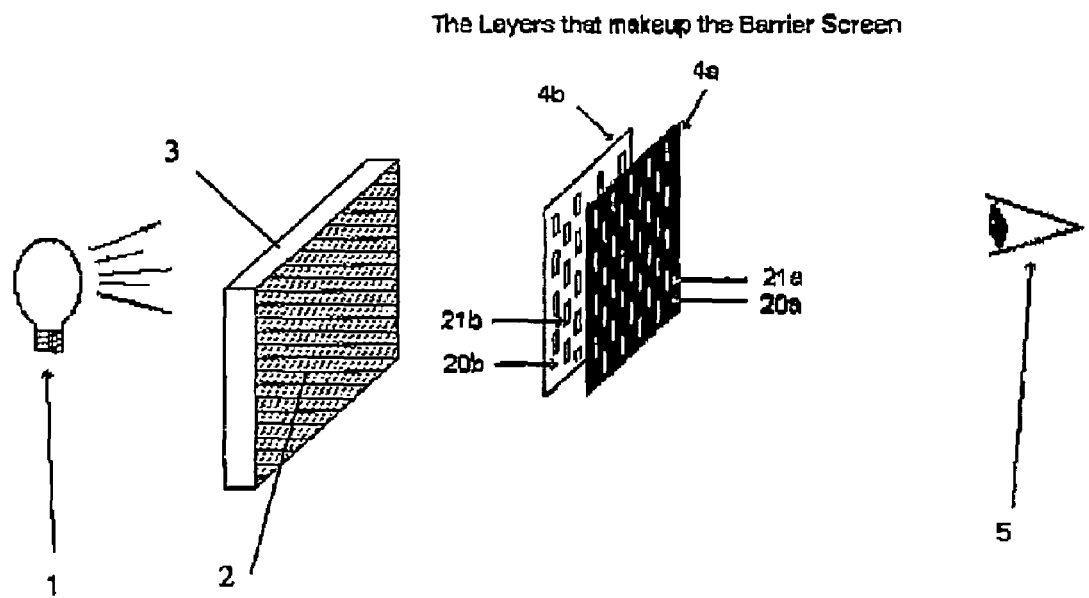
FIG. 5 illustrates the layers that make up the barrier screen when using the printed method as well as the different sizes of the slits depending on the layer on which they are found.

When printed directly onto the support media 3, the barrier screen 4 has two layers (FIG. 5). The front side 4a, which faces the viewers 5, has a generally opaque surface 20 and the rear side 4b, has a highly reflective coating at or onto which the light source 1 projects light. This reflective coating recycles the light directly onto the computer-processed image 2 thus reducing the energy consumption, the heat and the quantity of lumens, which are required to optimize the colors of the image. It is desirable for the barrier screen 4 to have a negligible thickness from its front to its rear sides. Other characteristics of the barrier screen 4 are the density, length and width of the slits 21, which are part of the parameterization.

A number of relatively short and narrow, clear transparent vertical slits 21 or apertures are inserted in the barrier screen 4. The exact width and length of the apertures 21, the horizontal distance 23 between the apertures 21, as well as the vertical gap 22 between the rows of apertures 21 may vary. The variations emanate from the relationships between five elements and five characteristics. The five elements are: the width (w) and length (l) of the apertures 21, the horizontal distance (g) 23 between the apertures 21, the vertical gap (d) 22 between the rows of apertures and the thickness (t) of the spacer 3. The five characteristics are: Luminosity (L), Horizontal viewing angle (H) and Vertical viewing angle (V), Depth (D) of field and Image (R) definition.

The Relationships (Rx) are:

$$w = 1/D = L \qquad \text{R.1.}$$

$$l = 1/D = L \qquad \text{R.2.}$$

$$g = 1/L = H = 1/R \qquad \text{R.3.}$$

$$d = V = 1/L \qquad \text{R.4.}$$

$$t = D = 1/H = 1/V \qquad \text{R.5.}$$

Figure 6:
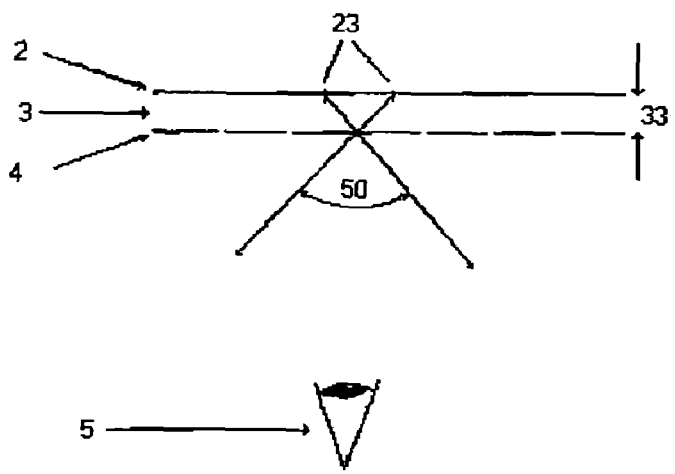
FIG. 6 illustrates the relationship between the viewing angle and the thickness of the spacer.

For instance, should the Horizontal (H) viewing angle 50 (FIG. 6) be the predominant characteristic to change, the Horizontal distance 23 (g) and/or the thickness 33 (t) of the spacer 3 might vary.

The lower limit of the Horizontal distance 23 (g) is determined by the highest available definition of the computer-processed image 2. When the level of Image (R) definition must increase from high to extremely high, the production method will change. While not exhaustive, two methods are considered when high to extremely high image definition are sought: The first method relates to offset printing and the integration of screening technologies. To obtain high definition images, standard screening should be used. To obtain very high to extremely high image definition, stochastic screening using screen dots between 10 and 5 microns should be used. The second method considered is photographic film. The alignment of the components (FIG. 2) that make up the 3-D Cast is always a crucial stage in obtaining the optimal "real" 3-D effect. The barrier screen 4 differs in the offset printing method in that it has two layers (FIGS. 5, 4a and 4b), which make up the front and back of the barrier screen 4. The two layers, 4a and 4b, must be perfectly aligned. To facilitate the alignment, the dimensions of the slits 21b in the highly reflective layer 4b must be slightly wider than the slits 21a of the layer 4a facing the viewer. When using photographic film, the two layers, 4a and 4b, should be used when feasible.

The spacer 3 (FIG. 6) can be a plate that is positioned between the barrier screen 4 and the computer-processed image 2. Its function is to provide the parallax effect. The thickness (t) of the spacer 3 will be determined by the specific application in which the computer-processed image 2 is used (Formula 5). The thickness (t) of the spacer 3 must be uniform and pre-determined as it greatly affects the Horizontal (H) and Vertical (V) viewing angles and the depth (D) of field (Formula 5). For example, should the spacer 3 be thicker, the Horizontal (H) and Vertical (V) viewing angles will be narrower but the Depth (D) of field will be deeper. Similarly, should the spacer 3 be too thin the Horizontal (H) and Vertical (V) viewing angles will be wider but the Depth (D) of field will not be as deep. The optimal thickness (t) is between these two limits.

The spacer 3 must be transparent and not translucent as the light emanating from the light source 1 must light the pixels of the computer-processed image 2 then pass through the apertures 21 in the barrier screen 4 so as to reach the viewer 5 without being diffused in any way. The materials used for the spacer 3 must be as light as possible while providing sufficient rigidity to eliminate breakage or the distortion brought about by the spacer 3 bending. The spacer 3 can be used as support media during the printing process. In this instance, both sides of the spacer 3, such as polymer film, must be treated for printing.

In a preferred embodiment, the individual cells in the image are delimited by generating the image to have each cell isolated. A rippled opaque line 45 (FIG. 7) is drawn on the top and bottom of each slit 21 along a horizontal row of cells, thus separating and/or isolating the rows of cells from each other. This feature eliminates the vertical distortions perceived when the viewer observes the 3D image past a certain vertical angle. As shown in the figure, cells in adjacent rows lie partially adjacent to each other in the vertical direction.

Figure 8:
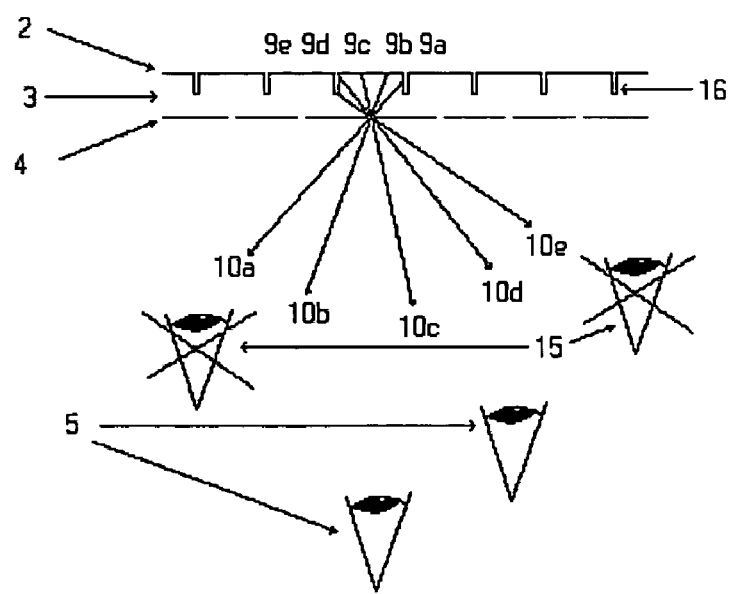
FIG. 8 illustrates an alternate embodiment for delimiting individual cells of an image.

In an alternative embodiment, a combination of the spacer and the barrier screen is provided to delimit the individual cells of the image. This configuration is shown in FIG. 8. The spacer may be manufactured such that small grooves 16 are made into the spacer 3 opposite the barrier screen 4 or on the side of the image 2. Such grooves 16 must be of constant depth, have the smallest possible width and surround each cell. The grooves 16 will limit the angle of vision 10a to 10e so that it is impossible to read information that is contained in an adjacent cell. In FIG. 8, the information from views 10b and 10c is valid, whereas the information from 10a, 10d, and 10e is not. At 15, the angle of vision is exceeded. From that specific position, the viewer cannot see the information contained in that cell.

Figure 9:
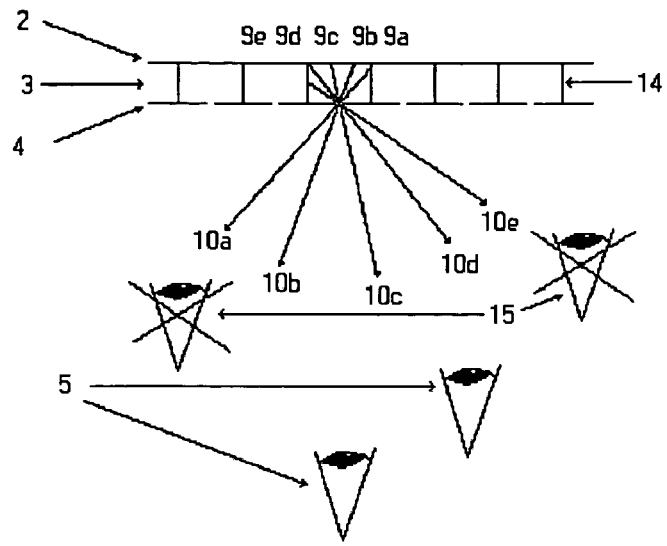
FIG. 9 illustrates another alternate embodiment for delimiting individual cells of an image.

Another configuration for the spacer and barrier screen is shown in FIG. 9. Opaque surfaces 14 are embedded in the spacer 3 in such a way as to effectively block light from penetrating more than one cell thus insulating adjacent cells. The opaque surfaces 14 limit the angle of vision 10a to 10e so that it is impossible to read information that is contained in an adjacent cell. In FIG. 9, the information from views 10b and 10c is valid whereas the information from 10a, 10d and 10e is not.

Figure 3:
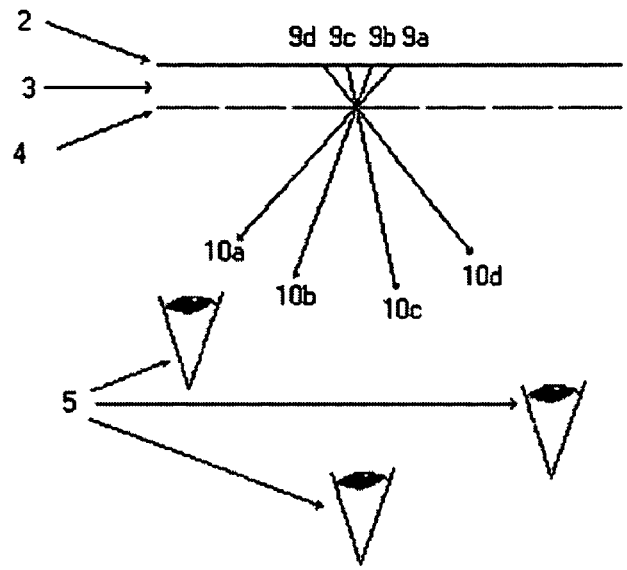
FIG. 3 illustrates the forming of many different points of view, which are seen through each slit/aperture.

When the image is seen through each vertical slit 21 of the barrier screen 4, only a portion of the information will pass thus making the overall result a highly coherent and smooth image for each of the horizontal points of view 10a-d (FIG. 3). The combination of the images from the tens of thousands of consecutive points of view 10a-d can be arranged so it can generate either a high quality color "real" 3-D auto-stereo static image; a High quality color "real" 3-D auto-stereo partially animated image; any other type of image effect where the various points of view 10a-d need different independent images. The computer-processed image 2 can be processed so as to generate each color of the rainbow in succession. The overall scene, which contains the high definition "real" 3-D image, will be enhanced by placing a 2-D image with 3-D perspective on the outer surface of the barrier screen 4. When the computer-processed image 2 and an efficient light source 1 are combined the scene can then be displayed using a CRT, plasma, LCD, or any other type of video display unit.

The computer-processed image 2 can then be applied directly onto the spacer 3 as well as to any partially transparent media such as paper, transparencies, film, LCD, or other transparent and/or translucent media. Aligning the computer-processed image 2 and the barrier screen 4 requires a high degree of precision. Maintaining the alignment on either side of the spacer 3 can be achieved by bonding the 3 essential elements: the computer-processed image 2 and the barrier screen 4 and the spacer 3. Together, these form the 3-D cast.

Such bonding methods can be printing (the components are printed directly on the spacer 3) or laminating (proofing systems or manual assembly process). Printing will provide optimal viewing if and only if the registers are perfectly aligned. With laminating, the high degree of precision required while aligning the barrier screen 4 with the computer-processed image 2 can be achieved with computer controlled lasers or cameras.

To optimize the viewing of a "real" 3-D image, the apparatus includes an efficient light source 1. The light source should be highly luminous with appropriate efficacy (lumens per watt). A stable light should be provided with no flicker, no noise emitting, and no loss of its brightness over time. Excellent color rendition is achieved where the index (CRI) is greater than 85. To maximize CRI, a color temperature of close to 5,900K must be used. Dispersion and/or distribution of light must be constant and uniform over the entire area of the illustration. Multiple lamps must emit the same color of light. The heat generated by the light source must be carefully monitored so that heat remains below a certain temperature, which once attained could negatively affect the quality of the 3-D properties. The selected light must generate the most lumens and the least amount of heat possible. The light source 1 must be monitored at all times to provide an optimal ratio between ambient and emitted light. As the emitted light is reduced from its optimal position, the darkest colors will slowly fade and eventually disappear. Too much light would negatively affect the viewing experience by creating a washout effect of the colors and deteriorating the 3-D effect while increasing the heat.

While the preferred method is to use a lighting system that emanates directly from behind the image substrate, it could also emanate from the sides, from a specific direction, or from multiple simultaneous directions, as long as it meets the minimum lighting quality requirements set forth and does not compromise the 3D effect.

Various methods can be used to generate the computer-processed image 2. Three such methods are described herein, these methods being used with the VIEWST™ assembly software. The following elements are common to the three methods described herein. The center of the scene 64 is at the origin O of the X,Y,Z coordinates within the spatial environment in which the scene lives. The camera 60, which can be real or virtual depending on the spatial environment, has a trajectory 63 parallel to the X-axis. Depending on the desired effect, the distance 66 between the focal point of the camera 60 and the X-axis must be set prior to the camera beginning its trajectory. All scenes contain a variety of objects. Depending on where the barrier screen 4 will be placed within the scene 64 the 3-D effect will impact how much an object, contained in the scene, will extrude from the viewing window. Everything in front of the barrier screen 4 will be part of the forward depth of field whereas everything that is behind will be part of the backward depth of field. Points of view 62$a$-$z$ can include tens of thousands of positions resulting in as many views for the viewers.

Figure 10:
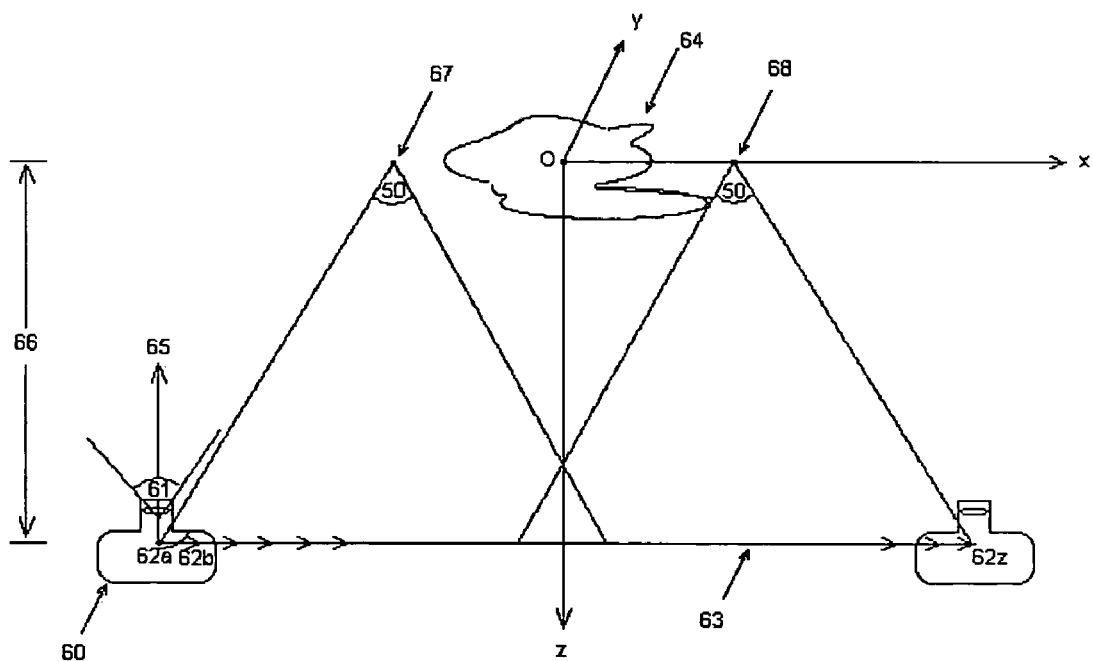
FIG. 10 illustrates the Look Front Method for producing views that will be processed by the VIEWS assembly software.

The first method is the Look-Front method (FIG. 10). Throughout its linear trajectory 63, the camera 60 must always look straight-ahead 65, down the Z-axis. The view angle 61 of the camera 60 must stay constant and be wider or equal to the view angle 50 (FIG. 6) of the 3-D cast 6. Once the view angle 50 is positioned on either side 67 & 68 of the scene 64, the start 62$a$ and finish 62$z$ positions of the camera trajectory 63 are found where the outer limits of the view angle 50, meet the camera trajectory 63. For this method, the barrier screen 4 position is a variable parameter that must be determined prior to running the VIEWS assembly software.

Figure 11:
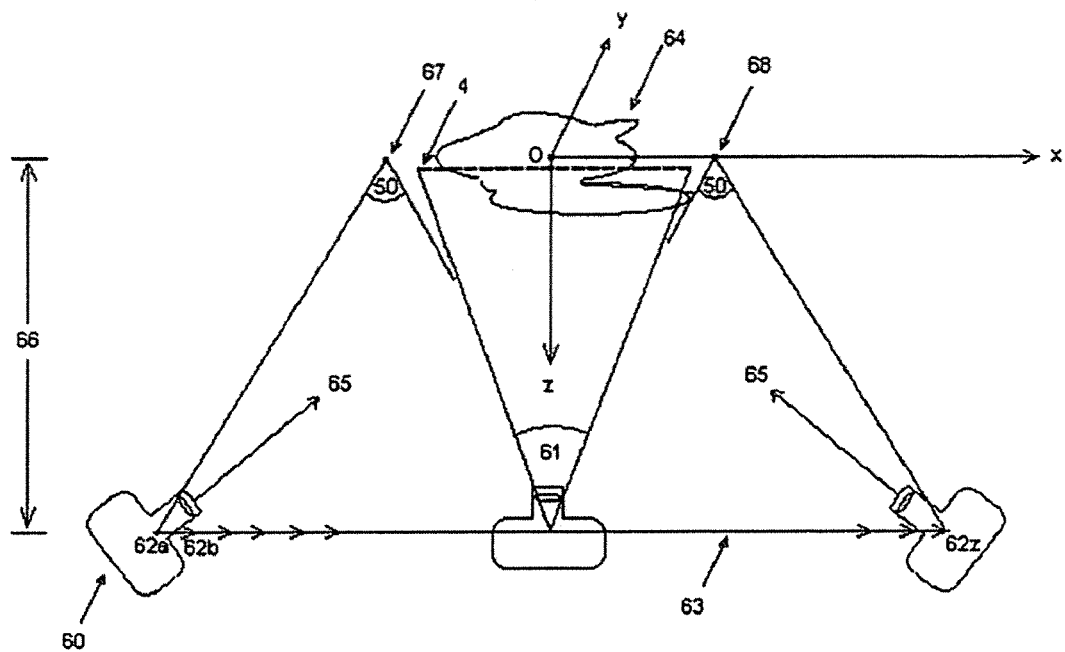
FIG. 11 illustrates the Look at Object Method for producing views that will be processed by the VIEWS assembly software.

The second method is the Look at object method (FIG. 11). Throughout its linear trajectory 63, the camera 60 must always look directly at the center of the scene 64. The view angle 61 of the camera 60 must be wide enough to include the barrier screen 4 when the camera 60 is in front of the scene 64. Once the view angle 50 is positioned on either side 67 & 68 of the scene 64, the start 62$a$ and finish 62$z$ positions of the camera trajectory 63 are found where the outer limits of the view angle 50, meet the camera trajectory 63. For this method, the barrier screen 4 position is a variable parameter that must be determined prior to running the VIEWS™ assembly software.

Figure 12:
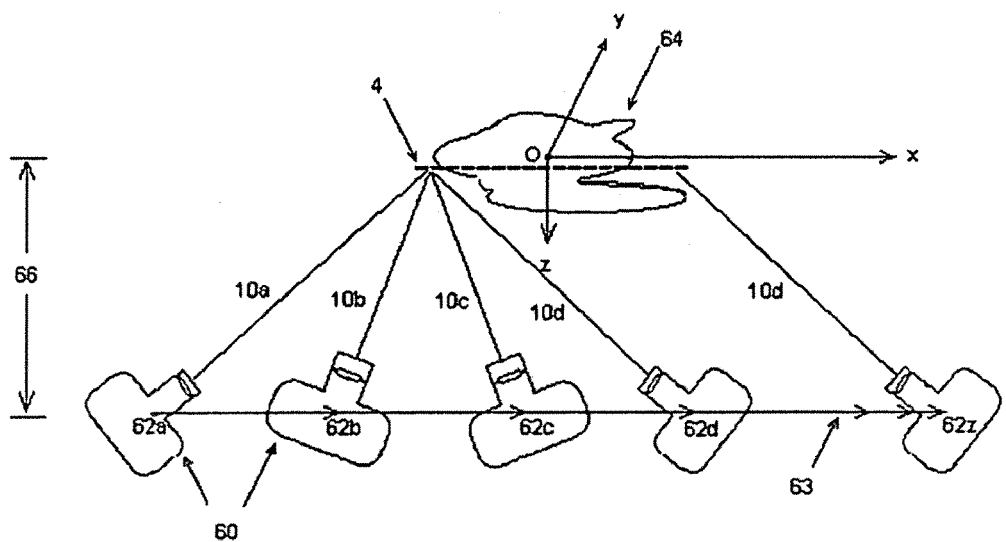
FIG. 12 illustrates the Look at Slit Method for producing views that will be processed by the VIEWS assembly software.

The third method is the Look at Slit Method (FIG. 12). For this method, the barrier screen 4 position, within the scene 64, must be determined prior to rendering the views. Each slit 21 on the barrier screen 4 forms multiple points of view 10$a$-$d$ (FIG. 3) each of which determine a precise position of the camera 60. The camera 60 must take into account the totality of points of view 62$a$-$z$ that emanate from all the slits 21 on the barrier screen 4. The vertical view angle 61 of the camera 60 must be wide enough to include the barrier screen 4 when the camera 60 is in front of the scene 64. The horizontal view angle must be approximately the width of a slit 21.

Precisely computing the exact position of the points of view 10$a$ to 10$d$ will optimize the image quality and the minimum number of views required. Method 3 always gives a fully optimized image quality as well as the precise number of views required. Methods 1 & 2 can be more or less optimized depending on the result sought. For example. The image quality will be optimized when the selected positions cover exactly all the points of view 10$a$-$d$ required by all the slits 21.

Figure 13:
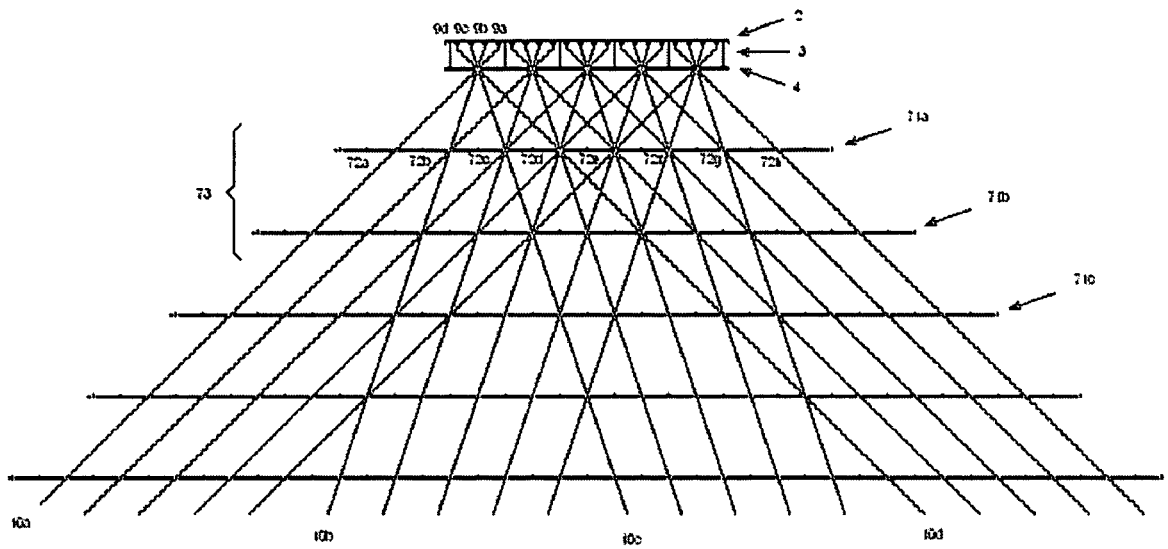
FIG. 13 illustrates the camera positions when selecting the optimal number of views for methods 1 and 2.

Within a pre-determined range 73 from the barrier screen 4, the minimal number of views required will be optimized (FIG. 13) when two or more points of view 10$a$-$d$ meet at an intersecting node 72$b$-$g$. From each node 72$b$-$g$, an imaginary line 71$a$-$c$ parallel to the barrier screen 4 is traced. On each imaginary line 71$a$-$c$ the sum of all nodes 72$b$-$g$ and the number of uncovered points of view 72$a$+72$h$ is computed. When the sum is minimal, optimization is achieved. The criteria for selecting the pre-determined range are the artistic value sought and the amount of forward depth of field wanted.

The views can originate from many sources such as 3-D modeling software, digitalized photography, video and/or movie. CAD software can produce the scene to be represented and render the thousands of views. Auto-modeling software can use a few digitalized images of a scene, which are created from various points of view, to extract a 3-D scene. CAD software can then render the views from the 3-D scene. Rail-mounted digital cameras or videos can produce photographs, video and/or movie from thousands of images that make-up a scene. The sequence of views must be controlled so as to precisely determine the position of each point of view.

Figure 14:
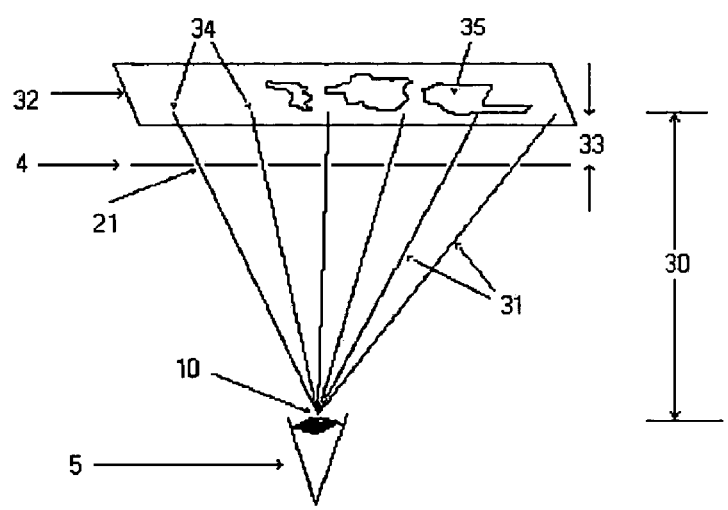
FIG. 14 illustrates method 1 to generate the computer-processed image.

The VIEWS™ assembly software imports the data that is generated from the above sources and places it in a virtual environment (FIG. 14). The software then processes the data as follows. A window 32 is created through which the 3-D modeling data will be viewed. A barrier screen 4 is assumed which is considered as having a pre-determined distance 33 from the window. A pixel 34 is selected to be colored on the computer-processed image 2. A straight line 31 is drawn from the center of the pixel 34, through the center of the nearest aperture 21, and to a point in space that is found at an arbitrary distance 30 from the window 32 and which becomes the new point of view 10 for the viewer 5. From this point of view 10, a 2-D image 35, with perspective, is generated so as to fit in the window 32. From this point of view 10, lines of sight 31 pass through the apertures 21 of the barrier screen 4 until it reaches specific pixels 34 on the 2-D image 35. Only the pixels 34 whose lines of sight 31 pass through a pre-determined distance from their center are considered. The color and position associated with each of the considered pixels 34 are then saved so as to become part of the final output, which is the computer-processed image 2. Any pixels 34 that were not previously considered will be selected during following passes. The procedure repeats itself until all the pixels 34 of the computer-processed image 2 are colored.

Alternatively, a three-dimensional model is generated using operator input and possibly 2-D images to texture the model to ensure that the original properties of the object are maintained. From the 3-D model, each cell of the image that will be behind a slit of the barrier-screen is created by selecting every pixel that can be seen when standing in a specific position. This process repeats itself until all the pixels are selected for all related positions. Ray tracing may also be used to select the pixels accordingly.

Figure 7:
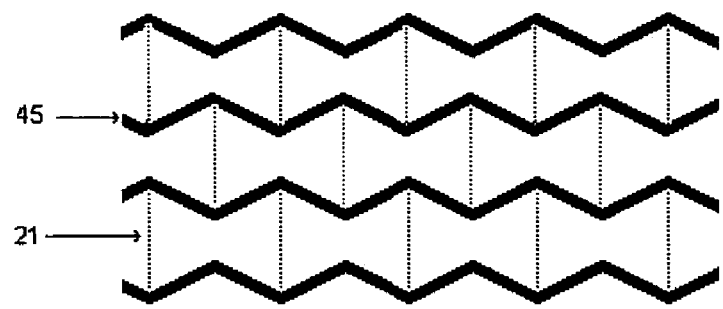
FIG. 7 illustrates the opaque rippled line drawn on top & bottom of cells.
Figure 15:
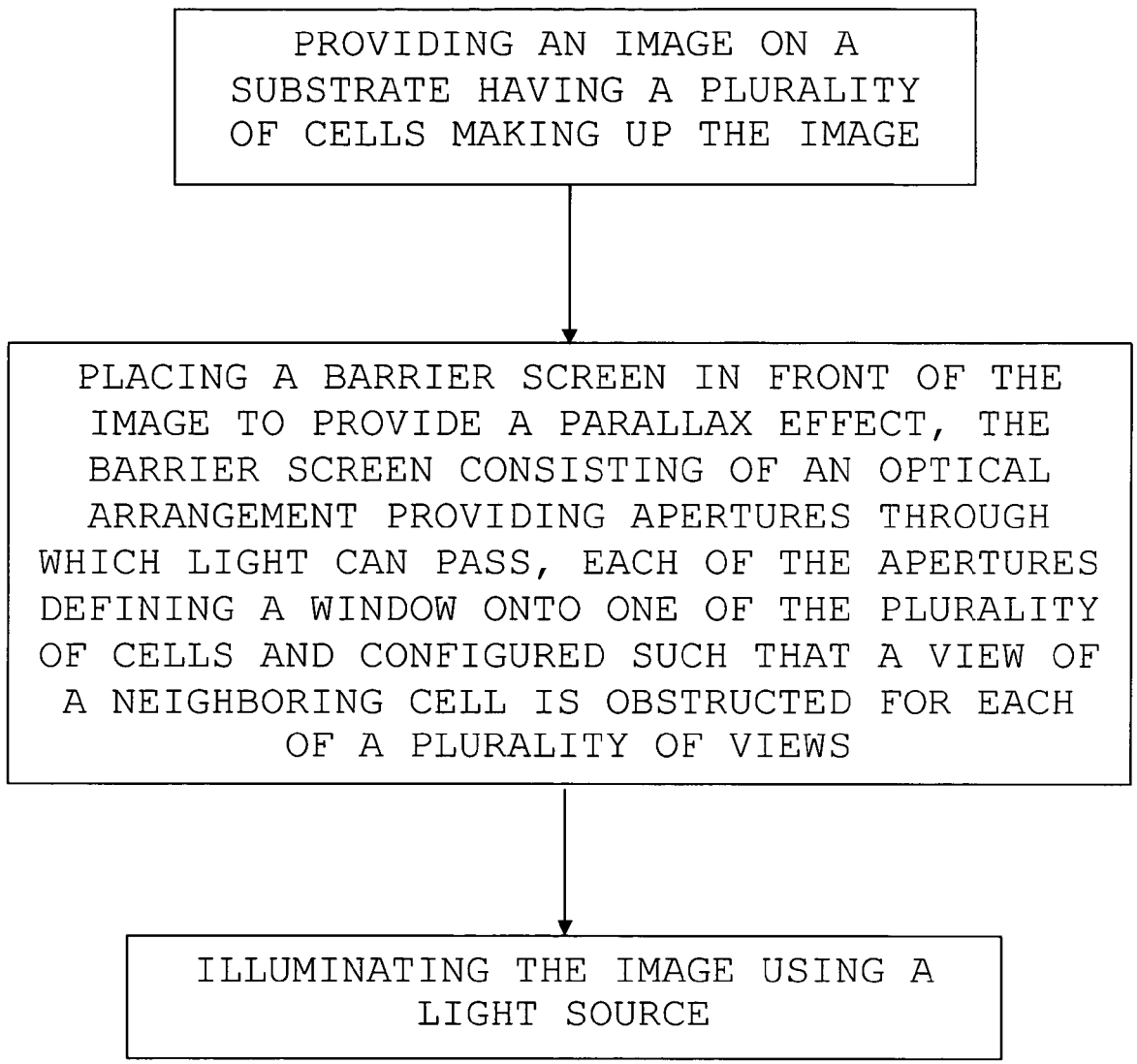
FIG. 15 is a flowchart illustrating a method for providing a three-dimensional auto-stereo image.

FIG. 15 is a flowchart illustrating the method of providing three-dimensional auto-stereo views from a plurality of points of views. An image is first provided on a substrate. The image is composed of a plurality of cells which define the image. Each cell is delimited and borders more than one neighboring cell. A barrier screen is then placed in front of the image. The barrier screen consists of an optical arrangement of apertures through which light can pass. Each aperture defines a window onto a cell of the image. As the angle of view progresses to either side of the center of the aperture, the view of a neighboring cell is obstructed. This can be done in a variety of ways, such as those shown in FIGS. 8 and 9. Alternatively, dark rippled lines, such as those seen in FIG. 7, are placed directly on the image to separate the different cells that make up the image. Finally, the image is illuminated by using a light source placed behind it.

Figure 16:
FIG. 16 is a flowchart illustrating a method of manufacturing a three-dimensional auto-stereo image.

In a preferred embodiment, the printed image is computer processed. The barrier screen is a slit-type barrier screen, and the apertures are aligned in a plurality of horizontal rows, wherein each row is staggered horizontally with respect to the subsequent row. Every second row is aligned. Also in a preferred embodiment, the barrier screen and the image are printed directly onto the same transparent substrate, or film, wherein the image is on one side and the barrier screen is a mask printed on the other side of the sheet. FIG. 16 is a flow chart illustrating this method for manufacturing the three-dimensional auto-stereo image. In a preferred embodiment, the second side of the substrate is printed with two layers of ink. A first layer is a highly reflective ink, while a second layer is a dark and opaque ink. Preferably, the apertures of the second layer are thinner than those of the first layer.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for providing auto-stereo three-dimensional views, the method comprising:
   providing an image on a substrate of sufficient transparency to allow light therethrough, said image comprising a plurality of interspersed views made up of pixels organized in a plurality of cells, each cell containing a plurality of said pixels that together make up a predetermined range of views for a region of the image in which the cell is located, each cell having a maximum height in a first direction that tapers continuously to a minimum height and being contiguous with at least one adjacent cell in a second direction perpendicular to the first direction so as to together form one of a plurality of cell rows, said cell rows lying adjacent to each other in the first direction with cell positions being staggered in the second direction from one row to an adjacent row such that a maximum cell height in a first row aligns substantially with a minimum cell height in an adjacent row, and cells in adjacent rows lie partially adjacent to each other in the second direction;
   placing a barrier screen in front of said image to provide a parallax effect, said barrier screen having a plurality of rows of staggered apertures through which light can pass, said apertures being elongate in the first direction and having a height in the first direction approximately equal to the maximum height of the cells, each aperture being positioned adjacent to one of the cells;
   providing a plurality of dark rippled lines that separate the cell rows on the image substrate; and
   illuminating said image from behind using a light source.

2. A method as claimed in claim 1, wherein said placing a barrier screen comprises placing a barrier screen having a film with at least one opaque layer and an additional layer, said opaque layer and said additional layer each having said staggered apertures.

3. A method as claimed in claim 2, wherein said opaque layer has a back side facing a viewer and covered in a dark material.

4. A method as claimed in claim 3, wherein placing a barrier screen in front of said image further comprises placing the barrier screen such that each aperture is aligned with a part of an adjacent cell in which the cell has said maximum height.

5. A method as claimed in claim 2, wherein said at least one additional layer has a back side facing said image and said light, and covered by a highly reflective material.

6. An apparatus for generating auto-stereo three-dimensional views, said apparatus comprising:
   an image on a substrate made of sufficient transparency to allow light therethrough, said image comprising a plurality of interspersed views made up of pixels organized in a plurality of cells, each cell containing a plurality of said pixels that together make up a predetermined range of views for a region of the image in which the cell is located, each cell having a maximum height in a first direction that tapers continuously to a minimum height and being contiguous with at least one adjacent cell in a second direction so as to together form one of a plurality of cell rows, said cell rows lying adjacent to each other in the first direction with cell positions being staggered in the second direction from one row to an adjacent row such that a maximum cell height in a first row aligns substantially with a minimum cell height in an adjacent row, and cells in adjacent rows lie partially adjacent to each other in the second direction;
   a barrier screen in front of said image to provide a parallax effect, said barrier screen having a plurality of rows of staggered apertures through which light can pass, said apertures being elongate in the first direction and having a height in the first direction approximately equal to the maximum height of the cells, each aperture being positioned adjacent to one of the cells;
   a plurality of dark rippled lines that separate the cell rows on the image substrate: and
   a light source positioned behind said image for illuminating said image.

7. An apparatus as claimed in claim 6, wherein said barrier screen comprises a film having at least one opaque layer and an additional layer, said opaque layer and said additional layer each having said clear, staggered apertures.

8. An apparatus as claimed in claim 7, wherein said opaque layer has a back side facing a viewer and covered in a dark material.

9. An apparatus as claimed in claim 8, wherein the barrier screen is located such that each aperture is aligned with a part of an adjacent cell in which the cell has said maximum height.

10. An apparatus as claimed in claim 7, wherein said at least one additional layer has a back side facing said image and said light, and covered by a highly reflective material.

* * * * *